United States Patent [19]
Lang et al.

[11] Patent Number: 6,153,723
[45] Date of Patent: Nov. 28, 2000

[54] SOIL RELEASE OLIGOESTERS

[75] Inventors: Frank-Peter Lang, Hattersheim; Johannes Becherer, Maintal, both of Germany; Michael Wessling, Charlotte, N.C.; Alexander Lerch, Glenhausen, Germany

[73] Assignee: Clariant GmbH, Frankfurt, Germany

[21] Appl. No.: 09/330,103

[22] Filed: Jun. 10, 1999

[30] Foreign Application Priority Data

Jun. 12, 1998 [DE] Germany .............................. 198 26 356

[51] Int. Cl.⁷ .................................................. C08G 63/66
[52] U.S. Cl. ........................... 528/300; 528/274; 528/301; 528/308; 510/108; 510/109; 510/360; 510/400; 510/403; 510/405; 510/445; 510/475
[58] Field of Search ..................................... 528/274, 300, 528/301, 308; 510/108, 109, 360, 400, 403, 405, 445, 475

[56] References Cited

U.S. PATENT DOCUMENTS

| | | |
|---|---|---|
| 3,416,952 | 12/1968 | McIntyre et al. . |
| 3,479,212 | 11/1969 | Robertson et al. . |
| 3,512,920 | 5/1970 | Dunlap . |
| 3,557,039 | 1/1971 | McIntyre et al. . |
| 3,712,873 | 1/1973 | Zenk . |
| 3,959,280 | 5/1976 | Furukawa et al. . |
| 3,962,152 | 6/1976 | Nicol et al. ................................ 252/8.9 |
| 4,116,885 | 9/1978 | Derstadt et al. .......................... 252/532 |
| 4,125,370 | 11/1978 | Nicol . |
| 4,427,557 | 1/1984 | Stockburger . |
| 4,702,857 | 10/1987 | Gosselink ........................... 252/174.21 |
| 4,721,580 | 1/1988 | Gosselink ................................. 252/90 |
| 4,877,896 | 10/1989 | Maldonado et al. ....................... 560/14 |
| 4,956,447 | 9/1990 | Gooselink et al. . |
| 5,142,020 | 8/1992 | Kud et al. . |
| 5,728,671 | 3/1998 | Rohrbaugh et al. . |

FOREIGN PATENT DOCUMENTS

| | | |
|---|---|---|
| 0066944 | 12/1982 | European Pat. Off. . |
| 0185427 | 6/1986 | European Pat. Off. . |
| 0241985 | 10/1987 | European Pat. Off. . |
| 0274907 | 7/1988 | European Pat. Off. . |
| 0319094 | 6/1989 | European Pat. Off. . |
| 0442101 | 8/1991 | European Pat. Off. . |
| 0752468 | 1/1997 | European Pat. Off. . |
| 2253063 | 5/1973 | Germany . |
| 2200911 | 10/1973 | Germany . |
| 3324258 | 1/1984 | Germany . |
| 19522431 | 2/1996 | Germany . |
| 93133 | 12/1977 | Poland . |
| 125292 | 10/1983 | Poland . |
| 121510 | 1/1984 | Poland . |
| 1377092 | 12/1974 | United Kingdom . |
| 2123848 | 2/1984 | United Kingdom . |
| WO 92/17523 | 10/1992 | WIPO . |

OTHER PUBLICATIONS

Derwent Patent Family Report and/or Abstract.
Chemical Abstract 90:56301z.
Chemical Abstract 101:92753c.
Chemical Abstract 101:112387s.
European Search Report.

*Primary Examiner*—Samuel A. Acquah
*Attorney, Agent, or Firm*—Miles B. Dearth; Scott E. Hanf

[57] ABSTRACT

The invention relates to oligoesters obtained by polycondensation of a) from 40 to 52 mol %, preferably from 45 to 50 mol %, of one or more dicarboxylic acids or esters thereof, b) from 10 to 40 mol %, preferably from 20 to 35 mol %, of ethylene glycol and/or propylene glycol, c) from 3 to 20 mol %, preferably from 10 to 15 mol %, of polyethylene glycol, d) from 0.5 to 10 mol %, preferably from 1 to 7.5 mol %, of a water-soluble addition product of from 5 to 80 mol of an alkylene oxide with 1 mol of $C_1$–$C_{24}$-alcohols, $C_6$–$C_{18}$-alkylphenols or $C_8$–$C_{24}$-alkylamines and e) from 0.4 to 10 mol %, preferably from 0.5 to 8 mol %, of one or more polyols having from 3 to 6 hydroxyl groups.

These oligoesters are used as soil release polymers in detergents.

2 Claims, No Drawings

SOIL RELEASE OLIGOESTERS

FIELD OF THE INVENTION

The present invention relates to soil release oligoesters, to their preparation and to their use in detergents and cleaning compositions.

DESCRIPTION OF THE RELATED ART

Soil release polymers have for many years been the subject of intensive development work. Originally developed as textile auxiliaries for the finishing of synthetic fibers, especially polyester fibers, they are nowadays also used as washing aids in detergents and cleaning compositions for domestic laundry. Besides "soil release polymers", another common term for compounds of this kind having a dirt-detaching capacity is "soil repellents", since they give the treated surfaces properties of dirt repellence.

The great majority of soil release polymers are polyesters based on terephthalic acid, polyalkylene glycols and monomeric glycols.

These compounds, owing to their structural similarity, are readily adsorbed by polyester fabric or by polyester blend fabric from an aqueous solution or a washing liquor, and form a hydrophilic film on the hydrophobic fabric. This film has the effect of reducing the affinity of the fabric for hydrophobic oily and fatty dirt. At the same time, the wettability of the polyester fabric with the aqueous wash liquor is enhanced. Both effects lead to greater ease of detachment of oily or fatty soiling, which is normally very difficult to remove from polyester fabric. Moreover, there is a marked improvement in moisture transport (water absorption and absorbency) in the treated hydrophobic fabrics, such as polyester or polyester/cotton blend fabric, which has a positive effect on the wear properties. In addition, the soil release polymers also improve the antistatic and slip properties. This facilitates the handling of the fabrics in the course of textile processing.

A host of patents and patent applications disclose the preparation of soil release polymers, improvements to their effectiveness, and methods of their application. In the text below, the abbreviations ET (=ethylene terephthalate), PET (=polyethylene terephthalate) and POET (=polyoxyethylene terephthalate) are used.

U.S. Pat. No. 3,557,039 discloses the preparation of soil release polyesters starting from dimethyl terephthalate and ethylene glycol in the presence of a catalyst comprising calcium acetate and antimony trioxide. U.S. Pat. No. 3,959,280 discloses a synthesis similar to that of U.S. Pat. No. 3,557,039, additionally using polyethylene oxide as a reactant. The resulting polyesters feature a molar ratio of ET:POET of from 25:75 to 35:65, a molar weight of the polyethylene oxide units in the POET of from 300 to 700, a molar weight of from 25,000 to about 55,000 and a melting point of less than 100° C.

Random PET-POET copolymers having an average molar weight of from 5000 to 200,000 are disclosed in U.S. Pat. No. 4,125,370. The PET:POET ratio varies from 20:80 to 90:10. The polyethylene oxide units have a molar weight of from 300 to 10,000. The preparation of these polymers is described in U.S. Pat. No. 3,959,280 and in U.S. Pat. No. 3,479,212.

The polyesters known from EP-A-0 241 985 comprise not only oxyethylene groups and terephthalic acid units but also 1,2-propylene, 1,2-butylene and/or 3-methoxy-1,2-propylene groups, and are terminally-capped with $C_1$- to $C_4$-alkyl groups.

EP-B-0 185 427 discloses oligoesters that are based on dimethyl terephthalate, ethylene glycol and/or propylene glycol and methyl- or ethylpolyethylene glycol, with each molecule containing on average from 4 to 11 terephthalic acid units.

According to U.S. Pat. No. 4,956,447, the performance of soil release polymers can be increased by cationization through the incorporation of quaternary nitrogen compounds.

U.S. Pat. No. 4,427,557 and EP-A-0 066 944 disclose polyesters which are anionically modified through the use of the sodium salt of sulfoisophthalic acid. The polyethylene glycols employed have molar weights of from 200 to 1000 g/mol. Polymerization with ethylene glycol and terephthalic acid gives oligoesters having molar weights of from 2000 to 10,000 g/mol.

EP-A-0 274 907 discloses sulfoethylene terminally-capped, terephthalate-containing soil release polyesters.

U.S. Pat. No. 3,712,873 discloses textile finishing formulations having a content of 1–5% of a polyester having a molar weight of from 3000 to 5000 based on terephthalic acid, polyethylene glycol and a $C_2$- to $C_4$-alkylene glycol. The formulations can be applied by spraying or padding.

U.S. Pat. No. 3,512,920 discloses the treatment of cotton/polyester fabrics by means of low molecular mass polyesters based on alkylene glycols, polyalkylene glycols and terephthalic acid together with starch derivatives or cellulose derivatives, and subsequent heat setting.

DE-A-22 53 063 discloses acidic textile finishing compositions which comprise a copolymer of a dicarboxylic acid and an alkylene polyglycol or cycloalkylene polyglycol and also comprise, if desired, an alkylene glycol and a cycloalkylene glycol.

WO-92/17523 describes the use of soil release polyesters with terminal methyl groups in detergents, and especially in fabric softener formulations.

PL 93 133 and PL 121 510 describe soil release finishes for the finishing of textiles made of cotton or cotton/polyester blend fabrics, which comprise soil release polymers which are obtained by the condensastion of dimethyl terephthalate, ethylene glycol, glycerol and polyethylene glycol having an average molar weight of 1540. PL 125 292 discloses a process for the polyfunctional finishing of textiles in which the above soil release polymer is present.

Detergents which comprise nonionic surfactants and a copolymer of polyoxyethylene glycol and polyethylene terephthalate are disclosed in DE-A-22 00 911.

EP-A-0 319 094 describes the use of ET/POET copolymers for the treatment of laundry in clothes driers. In addition to their action as a soil release polymer, particular emphasis is placed on their antistatic effect on the treated laundry.

A formulation format for soil release polymers is disclosed in DE-A-33 24 258. Formulation takes place by dissolving or dispersing a PET/POET polyester with PET:POET=2 to 6:1 in a liquid nonionic surfactant and spraying the mixture onto a builder.

Against the background of the prior art, therefore, the object was to develop improved soil release oligoesters.

SUMMARY OF THE INVENTION

It has now been found that oligoesters which are based on dicarboxylic acids, polyhydric alcohols, ethylene glycol and/or 1,2-propylene glycol and polyalkylene glycols, which are terminally-kept by alkylpolyethylene glycols and/ or arylpolyethylene glycols, have soil release properties which are markedly better than those of the prior art.

The invention provides oligoesters obtained by polycondensation of a) from 40 to 52 mol %, preferably from 45 to 50 mol %, of one or more dicarboxylic acids or esters thereof, b) from 10 to 40 mol %, preferably from 20 to 35 mol %, of ethylene glycol and/or propylene glycol, c) from 3 to 20 mol %, preferably from 10 to 15 mol %, of polyethylene glycol, d) from 0.5 to 10 mol %, preferably from 1 to 7.5 mol %, of a water-soluble addition product of from 5 to 80 mol of an alkylene oxide with 1 mol of $C_1$–$C_{24}$-alcohols, $C_6$–$C_{18}$-alkylphenols or $C_8$–$C_{24}$-alkylamines and e) from 0.4 to 10 mol %, preferably from 0.5 to 8 mol %, of one or more polyols having from 3 to 6 hydroxyl groups.

DESCRIPTION OF THE PREFERRED EMBODIMENTS

Examples of a suitable component a) for the preparation of the polyesters are terephthalic acid, phthalic acid, isophthalic acid and the mono- and dialkly esters with $C_1$- to $C_6$-alcohols, such as dimethyl terephthalate, diethyl terephthalate and di-n-propyl terephthalate. Further examples of compounds which can be used as component a) for the preparation of the polyesters are oxalic acid, succinic acid, glutaric acid, adipic acid, fumaric acid, maleic acid, itaconic acid, and the mono- and dialkyl esters of the carboxylic acids with $C_1$–$C_6$-alcohols, e.g. diethyl oxalate, diethyl succinate, diethyl glutarate, methyl adipate, diethyl adipate, di-n-butyl adipate, ethyl fumarate and dimethyl malate. If the dicarboxylic acids which are suitable are able to form anhydrides, the anhydrides of the carboxylic acids which have at least 2 carboxyl groups are also suitable as component a) compounds for the preparation of polyesters, e.g. maleic anhydride, phthalic anhydride or succinic anhydrides. Particularly preferred compounds for component a) are terephthalic acid, phthalic acid, isophthalic acid and their dimethyl, diethyl, dipropyl and dibutyl esters. It is of course possible to use mixtures of different carboxylic acids or of different esters. Likewise, it is also possible to use, for example, mixtures of carboxylic acids and esters, or mixtures of carboxylic acids and anhydrides in the condensation.

As component c), polyethylene glycols with molar weights of from 500 to 5000, preferably from 1000 to 3000, are used.

Suitable as component d) for the preparation of the polyesters are water-soluble addition products of from 5 to 80 mol of at least one alkylene oxide with 1 mol of $C_1$–$C_{18}$-alcohols, $C_6$–$C_{18}$-alkylphenols or $C_8$–$C_{24}$-alkylamines. Preference is given to monomethyl ethers of polyethylene glycols. The alkylene oxides used for the preparation of the compounds of component d) are preferably ethylene oxide and mixtures of ethylene oxide and propylene oxide. Also suitable are mixtures of ethylene oxide together with propylene oxide and/or butylene oxide, mixtures of ethylene oxide, propylene oxide and isobutylene oxide, or mixtures of ethylene oxide and at least one butylene oxide. These water-soluble addition products of alkylene oxides are surfactants. If they have been prepared using mixtures of alkylene oxides, the alkylene oxides present therein can be in blocks or in random distribution.

Suitable alcohols which are alkoxylated are, for example, octyl alcohol, decyl alcohol, lauryl alcohol, myristyl alcohol or stearyl alcohol, but in particular methanol, and the alcohols having from 8 to 24 carbon atoms obtainable by the Ziegler process, or the corresponding oxo alcohols. Of the alkylphenols, octylphenol, nonylphenol and dodecylphenol are of particular importance for the preparation of the corresponding surfactants. Of the suitable alkylamines, the $C_{12}$–$C_{18}$-monoalkylamines in particular are used to prepare the water-soluble surfactants.

Suitable polyols (component e) are, for example, pentaerythritol, trimethylolethane, trimethylolpropane, 1,2,3-hexanetriol, sorbit, mannitol and glycerol.

The oligoesters according to the invention are synthesized by processes known per se by heating components a, b, c, d and e, with the addition of a catalyst, to temperatures of from 160 to 220° C. firstly at atmospheric pressure. The reaction is then continued under reduced pressure at temperatures of from 160 to ca. 240° C., while distilling off excess glycols. Suitable transesterification and condensation catalysts for the reaction are those known from the prior art, examples being titanium tetraisopropylate, dibutyltin oxide or antimony trioxide/calcium acetate. For further details on carrying out the process, reference is made to EP 442 101.

The invention also provides for the use of these esters in detergents and cleaning compositions, especially for increasing their cleaning power in respect of oily and fatty soiling, and provides these detergents and cleaning compositions.

The detergent and cleaning-product formulations in which it is possible to employ the oligoesters according to the invention are pulverulent, granular, in paste or gel form or liquid or are solid washing bars. They contain at least 0.1%, preferably between 0.1 and 10% and, with particular preference, from 0.2 to 3% of the oligoesters according to the invention. Depending on their intended use, the composition of the formulations is adapted to the nature of the textiles that are to be washed or the surfaces that are to be cleaned. They comprise conventional detergent and cleaning-product ingredients in accordance with those of the prior art.

Representative examples of such detergent and cleaning-product ingredients are described below.

The overall concentration of surfactants in the finished detergent and cleaning-product formulation can be from 1% to 99% and, preferably, from 5% to 80% (all % by weight). The surfactants used can be anionic, nonionic, amphoteric or cationic. Mixtures of these surfactants can also be used. Preferred detergent and cleaning-product formulations comprise anionic and/or nonionic surfactants and mixtures thereof with other surfactants.

Suitable anionic surfactants are sulfates, sulfonates, carboxylates, phosphates and mixtures thereof. Suitable cations in this context are alkali metals, for example sodium or potassium, or alkaline earth metals, for example calcium or magnesium, and also ammonium, substituted ammonium compounds, including mono-,di- or triethanolammonium cations, and mixtures thereof. The following types of anionic surfactant are of particular interest: alkyl ester sulfonates, alkylsulfates, alkyl ether sulfates, alkylbenzenesulfonates, secondary alkanesulfonates and soaps, as described below.

Alkyl ester sulfonates are, inter alia, linear esters of $C_8$–$C_{20}$ carboxylic acids (i.e. fatty acids) which are sulfonated using gaseous $SO_3$ as described in "The Journal of the American Oil Chemists Society" 52 (1975), pp. 323–329. Suitable starting materials are natural fats, such as tallow, coconut oil and palm oil, or else may be synthetic in nature. Preferred alkyl ester sulfonates, especially for detergent applications, are compounds of the formula

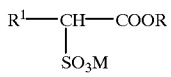

in which $R^1$ is a $C_8$–$C_{20}$ hydrocarbon radical, preferably alkyl, and R is a $C_1$–$C_6$ hydrocarbon radical, preferably alkyl. M is a cation which forms a water-soluble salt with the alkyl ester sulfonate. Suitable cations are sodium, potassium, lithium or ammonium cations, such as monoethanolamine, diethanolamine and triethanolamine. Preferably, $R^1$ is $C_{10}$–$C_{16}$-alkyl and R is methyl, ethyl or isopropyl. Particular preference is given to methyl ester sulfonates in which $R^1$ is $C_{10}$–$C_{16}$-alkyl.

Alkylsulfates here are water-soluble salts or acids of the formula $ROSO_3M$, in which R is a $C_{10}$–$C_{24}$ hydrocarbon radical, preferably an alkyl or hydroxyalkyl radical having a $C_{10}$–$C_{20}$-alkyl component, and, with particular preference, a $C_{12}$–$C_{18}$-alkyl or hydroxyalkyl radical. M is hydrogen or a cation, for example an alkali metal cation (e.g. sodium, potassium, lithium), or ammonium or substituted ammonium, for example methyl-, dimethyl- and trimethylammonium cations and quaternary ammonium cations, such as tetramethylammonium and dimethylpiperidinium cations and quaternary ammonium cations derived from alkylamines such as ethylamine, diethylamine, triethylamine and mixtures thereof. $C_{12}$–$C_{16}$-alkyl chains are preferred for low washing temperatures (e.g. below about 50° C.) and $C_{16}$–$C_{18}$-alkyl chains for higher washing temperatures (e.g. above about 50° C.).

Alkyl ether sulfates are water-soluble salts or acids of the formula $RO(A)_m SO_3M$, in which R is an unsubstituted $C_{10}$–$C_{24}$-alkyl or hydroxyalkyl radical, preferably a $C_{12}$–$C_{20}$-alkyl or hydroxyalkyl radical, and, with particular preference, a $C_{12}$–$C_{18}$-alkyl or hydroxyalkyl radical. A is an ethoxy or propoxy unit, m is a number greater than 0, preferably between about 0.5 and about 6 and, with particular preference, between about 0.5 and about 3, and M is a hydrogen atom or a cation such as sodium, potassium, lithium, calcium, magnesium, ammonium or a substituted ammonium cation, for example. Specific examples of substituted ammonium cations are methyl-, dimethyl-, trimethylammonium and quaternary ammonium cations such as tetramethylammonium and dimethylpiperidinium cations, and also those derived from alkylamines such as ethylamine, diethylamine, triethylamine or mixtures thereof. Examples are $C_{12}$ to $C_{18}$ fatty alcohol ether sulfates in which the content of EO is 1, 2, 2.5, 3 or 4 mol per mole of the fatty alcohol ether sulfate, and in which M is sodium or potassium.

In secondary alkanesulfonates the alkyl group can be either saturated or unsaturated, branched or linear and unsubstituted or substituted by a hydroxyl group. The sulfo group can be in any position on the C chain, with the primary methyl groups at the beginning and end of the chain not possessing sulfonate groups. The preferred secondary alkanesulfonates comprise linear alkyl chains having about 9 to 25 carbon atoms, preferably about 10 to about 20 carbon atoms and, with particular preference, about 13 to 17 carbon atoms. The cation is, for example, sodium, potassium, ammonium, mono-, di- or triethanolammonium, calcium or magnesium, and mixtures thereof. Sodium as cation is preferred.

Further suitable anionic surfactants are alkenyl- or alkylbenzenesulfonates. The alkenyl or alkyl group can be branched or linear and unsubstituted or substituted by a hydroxyl group. The preferred alkylbenzenesulfonates include linear alkyl chains having about 9 to 25 carbon atoms, preferably from about 10 to about 13 carbon atoms, and the cation is sodium, potassium, ammonium, mono-, di- or triethanolammonium, calcium or magnesium, and mixtures thereof. For mild surfactant systems magnesium is the preferred cation; for standard washing applications, on the other hand, it is sodium. The same applies to alkenylbenzenesulfonates.

The term anionic surfactants also includes olefinsulfonates obtained by sulfonation of $C_{12}$–$C_{24}$-, preferably $C_{14}$–$C_{16}$-α-olefins with sulfur trioxide, followed by neutralization. Owing to the preparation process, these olefin sulfates may contain relatively small amounts of hydroxyalkanesulfonates and alkanedisulfonates. Specific mixtures of α-olefinsulfonates are described in U.S. Pat. No. 3,332,880.

Further preferred anionic surfactants are carboxylates, for example fatty acid soaps and comparable surfactants. The soaps can be saturated or unsaturated and can contain various substitutents, such as hydroxyl groups or α-sulfonate groups. Preference is given to linear, saturated or unsaturated hydrocarbon radicals as the hydrophobic fraction with about 6 to about 30, preferably about 10 to about 18, carbon atoms.

Also suitable as anionic surfactants are salts of acylaminocarboxylic acids, the acyl sarcosinates which form by reaction of fatty acid chlorides with sodium sarcosinate in an alkaline medium; fatty acid-protein condensation products obtained by reaction of fatty acid chlorides with oligopeptides; salts of alkylsulfamidocarboxylic acids; salts of alkyl and alkylaryl ether carboxylic acids; $C_8$–$C_{24}$ olefinsulfonates, sulfonated polycarboxylic acids prepared by sulfonating the pyrolysis products of alkaline earth metal citrates, as described for example in GB-1,082,179; alkyl glycerol sulfates, oleyl glycerol sulfates, alkylphenol ether sulfates, primary paraffinsulfonates, alkyl phosphates, alkyl ether phosphates, isethionates, such as acyl isethionates, N-acyltaurides, alkyl succinates, sulfosuccinates, monoesters of sulfosuccinates (especially saturated and unsaturated $C_{12}$–$C_{18}$ monoesters) and diesters of the sulfosuccinates (especially saturated and unsaturated $C_{12}$–$C_{18}$ diesters), acyl sarcosinates, sulfates of alkylpolysaccharides, such as sulfates of alkylpolyglycosides, branched primary alkyl sulfates and alkylpolyethoxycarboxylates such as those of the formula $RO(CH_2CH_2)_kCH_2COO^-M^+$, in which R is $C_8$- to $C_{22}$-alkyl, k is a number from 0 to 10 and M is a cation, resin acids or hydrogenated resin acids, such as rosin or hydrogenated rosin or tall oil resins and tall oil resin acids. Further examples are described in "Surface Active Agents and Detergents" (Vol. I and II, Schwartz, Perry and Berch).

Examples of suitable nonionic surfactants are the following compounds: Polyethylene, polypropylene and polybutylene oxide condensates of alkylphenols.

These compounds comprise the condensation products of alkylphenols having a $C_6$- to $C_{20}$-alkyl group, which can be either linear or branched, with alkene oxides. Preference is given to compounds having from about 5 to 25 mol of alkene oxide per mole of alkylphenol. Commercially available surfactants of this type are, for example, Igepal® CO-630, Triton® X-45, X-114, X-100 and X102, and the ®Arkopal-N grades from Clariant GmbH. These surfactants are termed alkylphenol alkoxylates, for example alkylphenol ethoxylates.

Condensation products of aliphatic alcohols with from about 1 to about 25 mol of ethylene oxide.

The alkyl chain of the aliphatic alcohols can be linear or branched, primary or secondary, and contains in general about 8 to about 22 carbon atoms. Particular preference is given to the condensation products of $C_{10}$ to $C_{20}$ alcohols having from about 2 to about 18 mol of ethylene oxide per mole of alcohol. The alkyl chain can be saturated or unsaturated. The alcohol ethoxylates can have a narrow (narrow range ethoxylates) or a broad (broad range ethoxylates) homologous distribution of the ethylene oxide. Examples of commercially available nonionic surfactants of this type are Tergitol® 15-S-9 (condensation product of a linear secondary $C_{11}$–$C_{15}$ alcohol with 9 mol of ethylene oxide), Tergitol® 24-L-NMW (condensation product of a linear primary $C_{12}$–$C_{14}$ alcohol with 6 mol of ethylene oxide, with a narrow molar weight distribution). Also part of this class of product are the Genapol® grades from Clariant GmbH.

Condensation products of ethylene oxide with a hydrophobic base, formed by condensation of propylene oxide with propylene glycol.

The hydrophobic part of these compounds preferably has a molecular weight of between about 1500 and about 1800. The addition of ethylene oxide onto this hydrophobic part leads to an improvement in the solubility in water. The product is liquid up to a polyoxyethylene content of about 50% of the overall weight of the condensation product, which corresponds to condensation with up to about 40 mol of ethylene oxide. Commercially available examples of this class of product are the Pluronic® grades from BASF and the ®Genapol PF grades from Clariant GmbH.

Condensation products of ethylene oxide with a reaction product of propylene oxide and ethylenediamine.

The hydrophobic unit of these compounds consists of the reaction product of ethylenediamine with excess propylene oxide and generally has a molecular weight of from about 2500 to 3000. Ethylene oxide is added onto this hydrophobic unit up to a content of from about 40 to about 80% by weight of polyoxyethylene and to a molecular weight of from about 5000 to 11,000. Commercially available examples of this class of compound are the ®Tetronic grades from BASF and the ®Genapol PN grades from Clariant GmbH.

Semipolar nonionic surfactants

This category of nonionic compounds comprises water-soluble amine oxides, water-soluble phosphine oxides and water-soluble sulfoxides, each having an alkyl radical of about 10 to about 18 carbon atoms. Semipolar nonionic surfactants include amine oxides of the formula

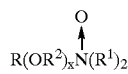

where R is an alkyl, hydroxyalkyl or alkylphenol group having a chain length of about 8 to about 22 carbon atoms, $R^2$ is an alkylene or hydroxyalkylene group having about 2 to 3 carbon atoms, or mixtures thereof, each radical $R^1$ is an alkyl or hydroxyalkyl group having about 1 to about 3 carbon atoms or a polyethylene oxide group having about 1 to about 3 ethylene oxide units, and x is a number from about 0 to about 10. The $R^1$ groups can be linked to one another by way of an oxygen or nitrogen atom and can therefore form a ring. Amine oxides of this kind are, in particular, $C_{10}$–$C_{18}$-alkyldimethylamine oxides and $C_8$–$C_{12}$-alkoxyethyldihydroxyethylamine oxides.

Fatty acid amides
Fatty acid amides have the formula

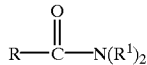

in which R is an alkyl group having about 7 to about 21, preferably about 9 to about 17, carbon atoms and each radical $R^1$ is hydrogen, $C_1$–$C_4$-alkyl, $C_1$–$C_4$-hydroxyalkyl or $(C_2H_4O)_xH$ where x varies from about 1 to about 3. Preference is given to $C_8$–$C_{20}$ amides, monoethanolamides, diethanolamides and isopropanolamides.

Further suitable nonionic surfactants are alkyl and alkenyl oligoglycosides and also fatty acid polyglycol esters or fatty amine polyglycol esters having in each case 8 to 20, preferably 12 to 18 C atoms in the fatty alkyl radical, alkoxylated triglycamides, mixed ethers or mixed formyls, alkyl oligoglycosides, alkenyl oligoglycosides, fatty acid N-alkylglucamides, phosphine oxides, dialkyl sulfoxides and protein hydrolyzates.

Typical examples of amphoteric and zwitterionic surfactants are alkyl betaines, alkylamide betaines, aminopropionates, aminoglycinates or amphoteric imidazolinium compounds of the formula

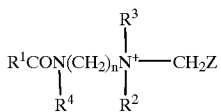

in which $R^1$ is $C_8$–$C_{22}$-alkyl or -alkenyl, $R^2$ is hydrogen or $CH_2CO_2M$, $R^3$ is $CH_2CH_2OH$ or $CH_2CH_2OCH_2CH_2CO_2M$, $R^4$ is hydrogen, $CH_2CH_2OH$ or $CH_2CH_2COOM$, Z is $CO_2M$ or $CH_2CO_2M$, n is 2 or 3, preferably 2, and M is hydrogen or a cation such as alkali metal, alkaline earth metal, ammonium or alkanolammonium.

Preferred amphoteric surfactants of this formula are monocarboxylates and dicarboxylates. Examples thereof are cocoamphocarboxypropionate, cocoamidocarboxypropionic acid, cocoamphocarboxyglycinate (alternatively referred to as cocoamphodiacetate) and cocoamphoacetate.

Other preferred amphoteric surfactants are alkyldimethyl betaines and alkyldipolyethoxy betaines with an alkyl radical having about 8 to about 22 carbon atoms, which can be linear or branched, preferably having 8 to 18 carbon atoms and, with particular preference, having about 12 to about 18 carbon atoms. These compounds are marketed, for example, by Clariant GmbH under the trade name ®Genagen LAB.

Suitable cationic surfactants are substituted or unsubstituted straight-chain or branched quaternary ammonium salts of the type $R^1N(CH_3)_3^{\oplus}X^{\ominus}$, $R^1R^2N(CH_3)_2^{\oplus}X^{\ominus}$, $R^1R^2R^3N(CH_3)^{\oplus}X^{\ominus}$ or $R^1, R^2R^3R^4N^{\oplus}X^{\ominus}$. The radicals $R^1$, $R^2$, $R^3$ and $R^4$ can preferably and independently of one another be unsubstituted alkyl having a chain length of between 8 and 24 C atoms, in particular between 10 and 18 C atoms, hydroxyalkyl having about 1 to about 4 C atoms, phenyl, $C_2$- to $C_{18}$-alkenyl, $C_7$- to $C_{24}$-aralkyl, $(C_2H_4O)_xH$, where x is from about 1 to about 3, alkyl radicals containing one or more ester groups, or cyclic quaternary ammonium salts. X is an appropriate anion.

Additional detergent and cleaning-product ingredients which may be included in the present invention comprise inorganic and/or organic builders in order to reduce the hardness of the water.

These builders can be present in proportions of from about 5% to about 80% by weight in the detergent and cleaning-product compositions. Inorganic builders include, for example, alkali metal, ammonium and alkanol ammonium salts of polyphosphates, for instance tripolyphosphates, pyrophosphates and vitreous polymeric metaphosphates, phosphonates, silicates, carbonates, including bicarbonates and sesquicarbonates, sulfates and aluminosilicates.

Examples of silicate builders are the alkali metal silicates, especially those having an $SiO_2:Na_2O$ ratio of between 1.6:1 and 3.2:1, and also phyllosilicates, for example sodium phyllosilicates, as described in U.S. Pat. No. 4,664,839, obtainable from Clariant GmbH under the brand SKS®. SKS-6® is a particularly preferred phyllosilicate builder.

Aluminosilicate builders are particularly preferred for the present invention. These are, in particular, zeolites having the formula $Na_z[(AlO_2)_z(SiO_2)_y].xH_2O$, in which z and y are integers of at least 6, the ratio of z to y is between 1.0 and about 0.5, and x is an integer from about 15 to about 264.

Appropriate aluminosilicate-based ion exchangers are obtainable commercially. These aluminosilicates can be crystalline or amorphous in structure, and can be naturally occurring or else synthetically prepared. Processes for the preparation of ion exchangers based on aluminosilicate are described in U.S. Pat. No. 3,985,669 and U.S. Pat. No. 4,605,509. Preferred ion exchangers based on synthetic crystalline aluminosilicates are obtainable under the designation zeolite A, zeolite P(B) (including those disclosed in EP-A-0 384 070) and zeolite X. Preference is given to aluminosilicates having a particle diameter of between 0.1 and 10 $\mu$m.

Suitable organic builders include polycarboxy compounds, for example ether polycarboxylates and oxydisuccinates, as described for example in U.S. Pat. No. 3,128,287 and U.S. Pat. No. 3,635,830. Reference should likewise be made to "TMS/TDS" builders from U.S. Pat. No. 4,663,071.

Other suitable builders include the ether hydroxypolycarboxylates, copolymers of maleic anhydride with ethylene or vinyl methyl ether, 1,3,5-trihydroxybenzene-2,4,6-trisulfonic acid and carboxymethyloxysuccinic acid, the alkali metal, ammonium and substituted ammonium salts of polyacetic acids, for example ethylenediaminetetraacetic acid and nitrilotriacetic acid, and also polycarboxylic acids, such as mellitic acid, succinic acid, oxydisuccinic acid, polymaleic acid, benzene-1,3,5-tricarboxylic acid, carboxymethyloxysuccinic acid and soluble salts thereof.

Citrate-based builders, for example citric acid and its soluble salts, especially the sodium salt, are preferred polycarboxylic acid builders which can also be used in granulated formulations, especially together with zeolites and/or phyllosilicates. Further suitable builders are the 3,3-dicarboxy4-oxa-1,6-hexanedioates and the related compounds which are disclosed in U.S. Pat. No. 4,566,984.

If phosphorus-based builders can be used, and especially if the intention is to formulate soap bars for washing by hand, it is possible to use various alkali metal phosphates, for instance sodium tripolyphosphate, sodium pyrophosphate and sodium orthophosphate. It is likewise possible to use phosphonate builders, such as ethane-1-hydroxy-1,1-diphosphonate and other known phosphonates as are disclosed, for example, in U.S. Pat. No. 3,159,581, U.S. Pat. No. 3,213,030, U.S. Pat. No. 3,422,021, U.S. Pat. No. 3,400,148 and U.S. Pat. No. 3,422,137.

In a preferred embodiment of the invention the conventional cleaning-product ingredients can be selected from components which are typical of those in cleaning compositions, such as surface-active substances and builders. If desired, the cleaning-product ingredients can include one or more cleaning auxiliaries or other materials which intensify the cleaning effect, which serve for treatment or care of the article to be cleaned, or which alter the service properties of the cleaning-product composition. Suitable cleaning auxiliaries in cleaning-product compositions include the substances specified in U.S. Pat. No. 3,936,537. The cleaning auxiliaries which can be used in the cleaning-product compositions of the present invention comprise, for example, enzymes, especially proteases, lipases and cellulases, foam boosters, foam limiters, antitarnish and/or anticorrosion agents, suspension agents, colorants, fillers, fluorescent whiteners, disinfectants, alkalis, hydrotropic compounds, antioxidants, enzyme stabilizers, perfumes, solvents, solubilizers, antiredeposition agents, dispersants, color transfer inhibitors, for example polyamine N-oxides, such as poly(4-vinylpyridine N-oxide), polyvinylpyrrolidone, poly-N-vinyl-N-methylacetamide and copolymers of N-vinylimidazole and N-vinylpyrrolidone, processing auxiliaries, softeners and antistatic auxiliaries.

The detergent and cleaning-product compositions of the present invention can if desired include one or more conventional bleaches, and also activators or stabilizers, especially peroxy acids, which do not react with the soil release oligoesters of the invention. In general it must be ensured that the bleaches used are compatible with the cleaning-product ingredients. Conventional test methods, such as the determination of the bleaching activity of the ready-formulated cleaning composition as a function of storage time, can be used for this purpose.

The peroxy acid can be either a free peroxy acid or a combination of an inorganic persalt, for example sodium perborate or sodium percarbonate, with an organic peroxy acid precursor, which is converted to a peroxy acid when the combination of the persalt and the peroxy acid precursor is dissolved in water. The organic peroxy acid precursors are often referred to in the prior art as bleach activators.

Examples of suitable organic peroxy acids are disclosed in U.S. Pat. No. 4,374,035, U.S. Pat. No. 4,681,592, U.S. Pat. No. 4,634,551, U.S. Pat. No. 4,686,063, U.S. Pat. No. 4,606,838 and U.S. Pat. No. 4,671,891. Examples of compositions suitable for bleaching laundry and containing perborate bleaches and activators are described in U.S. Pat. No. 4,412,934, U.S. Pat. No. 4,536,314, U.S. Pat. No. 4,681,695 and U.S. Pat. No. 4,539,130.

Examples of peroxy acids which are preferred for use in this invention include peroxydodecanedioic acid (DPDA), the nonylamide of the peroxysuccinic acid (NAPSA), the nonylamide of peroxyadipic acid (NAPM) and decyldiperoxysuccinic acid (DDPSA). The peroxy acid is preferably contained within soluble granules in accordance with the method of U.S. Pat. No. 4,374,035. A preferred granular bleaching formulation comprises, in percent by weight, from 1% to 50% of a compound which is exothermically soluble, for example boric acid; from 1% to 25% of a surface-active ingredient compatible with the peroxy acid, for example C13LAS; from 0.1% to 10% of one or more chelate stabilizers, for example sodium pyrophosphate; and from 10% to 70% of a water-soluble salt, for example sodium sulfate.

The bleach, containing peroxy acid, is used in amounts which give rise to an available oxygen level of between about 0.1% and about 10%, preferably between about 0.5% and about 5% and, in particular, from about 1% to 4%. The percentages are based on the overall weight of the cleaning-product composition.

Suitable amounts of the peroxy acid-containing bleach, based on one unit dose of the cleaning-product composition according to the invention, as used for a typical washing liquor comprising about 65 liters of water at from 15 to 60° C., produce between about 1 ppm and about 150 ppm of available oxygen, preferably between about 2 ppm and about 20 ppm of available oxygen. The washing liquor should have a pH of between 7 and 11, preferably between 7.5 and 10.5, in order to provide for adequate bleaching. Reference is made to column 6, lines 1 to 10 of U.S. Pat. No. 4,374,035.

Alternatively, the bleach composition can comprise an appropriate organic peroxy acid precursor which produces one of the abovementioned peroxy acids when it reacts in aqueous alkaline solution with hydrogen peroxide. The hydrogen peroxide source can be any inorganic peroxide which in aqueous solution releases hydrogen peroxide, such as sodium perborate (monohydrate and tetrahydrate) and sodium percarbonate.

The proportion of the peroxide-containing bleach in the novel cleaning-product compositions is between about 0.1% by weight and about 95% by weight and, preferably, between about 1% by weight and about 60% by weight. If the bleach composition is also a fully formulated cleaning-product composition, the content of the peroxide-containing bleach is preferably between about 1% by weight and about 20% by weight.

The amount of bleach activators that can be used with the soil release oligoesters of the invention is in general between 0.1 and 60% by weight, preferably between 0.5 and 40% by weight. If the bleach compositions used are at the same time fully formulated detergent compositions, then the amount of bleach activators present therein is preferably between about 0.5 and 20% by weight.

The peroxy acid and the soil release oligoesters of the invention are preferably in a weight ratio of available oxygen from the peroxy acid to soil release oligoester of the invention of from about 4:1 to about 1:30, in particular from about 2:1 to about 1:15 and, specifically, from about 1:1 to about 1:7.5. This combination can be used either as a fully formulated product or else as an additive to a detergent.

The cleaning-product compositions of the invention can comprise one or more conventional enzymes which do not react with the novel soil release oligoesters of this invention. A particularly preferred enzyme is cellulase. The cellulase used in this case can have been obtained from bacteria or fungi and should feature an optimum pH range of between 5 and 9.5. Suitable cellulases are disclosed in U.S. Pat. No. 4,435,307. The cellulase in question is produced by a strain of Humicola insolens, especially from the strain Humicola DSM 1800 or another cellulase-212-producing fungus belonging to the genus Aeromonas, and also cellulase extracted from the hepatopancreas of certain marine mollusks. Suitable cellulases are likewise disclosed in GB-A-2,075,028, GB-A-2,085,275 and DE-A-2,247,832.

Preferred cellulases are described in WO-91/17243. The cleaning-product compositions of the invention contain enzymes in amounts of up to about 50 mg, preferably from about 0.01 mg to about 10 mg per gram of the cleaning-product composition. Based on the weight of the detergent and cleaning-product compositions which comprise the soil release oligoesters of the invention, the proportion of enzymes is at least 0.001% by weight, preferably between about 0.001% and about 5% by weight, in particular from about 0.001% by weight to about 1% by weight and, specifically, from about 0.01% by weight to about 1% by weight.

The soil release oligoesters of the invention, which are used in aqueous textile washing liquors in concentrations of between about 1 and about 180 ppm, preferably in concentrations of between about 30 and about 90 ppm, bring about an effective cleaning and dirt-detaching treatment for polyesters, polyester/cotton blends and other synthetic fabrics. The textile washing liquors are preferably alkaline, with a pH range of between about 7 and about 11, in particular between about 7.5 and about 10.5, with typical detergent ingredients being present. Surprisingly, especially as far as the pH and anionic surface-active compounds are concerned, the detersives customarily present in detergents and cleaning compositions can also be used in the cleaning compositions of the invention in the amounts corresponding to the prior art. In these compositions they fulfill their usual purpose, i.e. the cleaning or bleaching of fabric, for example, without having any deleterious effect on the dirt-detaching properties of the soil release oligoesters of the invention.

In order to obtain a soil release finish, the soil release oligoesters of the invention can also be employed in customary commercial fabric softeners for domestic use. These essentially comprise softening components, co-softeners, emulsifiers, perfumes, colorants and electrolytes, and are formulated to an acidic pH below 7, preferably between 3 and 5.

Softening components employed are quaternary ammonium salts of the type

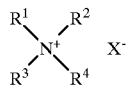

in which $R^1 = C_8–C_{24}$ n- or iso-alkyl, preferably $C_{10}–C_{18}$ n alkyl $R^2 = C_1–C_4$-alkyl, preferably methyl $R^3 = R^1$ or $R^2$ $R^4 = R^2$ or hydroxyethyl or hydroxypropyl or oligomers thereof $X^- =$ bromide, chloride, iodide, methosulfate, acetate, propionate, lactate.

Examples thereof are distearyldimethylammonium chloride, ditallow-alkyldimethylammonium chloride, ditallow-alkylmethylhydroxypropyl-ammonium chloride, cetyltrimethylammonium chloride or also the corresponding benzyl derivatives, such as dodecyidimethylbenzylammonium chloride. Cyclic quaternary ammonium salts, such as alkyl-morpholine derivatives, can likewise be employed.

In addition to the quaternary ammonium compounds, furthermore, it is possible to employ imidazolinium compounds (1) and imidazoline derivatives (2)

(1)

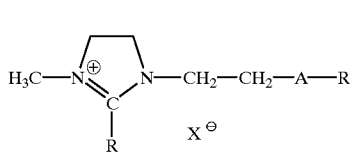

-continued

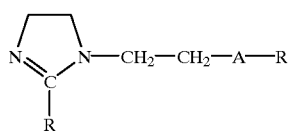
(2)

in which

R=$C_8$–$C_{24}$ n- or iso-alkyl, preferably $C_{10}$–$C_{18}$ n-alkyl
X=bromide, chloride, iodide, methosulfate
A=—NH—CO—, —CO—NH—, —O—CO—, —CO—O—.

A particularly preferred class of compounds is that of the so-called ester quats. These are reaction products of alkanolamines and fatty acids that are subsequently quaternized with customary alkylating or hydroxyalkylating agents.

Preferred alkanolamines are compounds of the formula

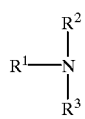

where $R^1$=$C_1$–$C_3$-hydroxyalkyl, preferably hydroxyethyl, and
$R^2$, $R^3$=$R^1$ or $C_1$–$C_3$-alkyl, preferably methyl.

Triethanolamine and methyldiethanolamine are particularly preferred.

Further particularly preferred starting products for ester quats are aminoglycerol derivatives such as dimethylaminopropanediol, for example.

Alkylating or hydroxyalkylating agents are alkyl halides, preferably methyl chloride, dimethyl sulfate, ethylene oxide and propylene oxide.

Examples of ester quats are compounds of the formulae:

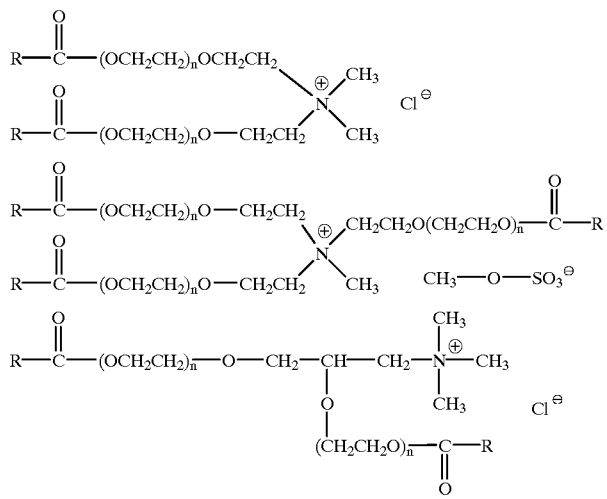

in which R—C—O is derived from saturated or unsaturated $C_8$–$C_{24}$ fatty acids. Examples thereof are caproic acid, caprylic acid, hydrogenated, nonhydrogenated or partially hydrogenated tallow fatty acids, stearic acid, oleic acid, linolenic acid, behenic acid, palmitostearic acid, myristic acid and elaidic acid. n is in the range from 0 to 10, preferably from 0 to 3, and with particular preference from 0 to 1.

Other preferred laundry softener raw materials with which the soil release oligoesters of the invention can be combined are amido-amines based, for example, on dialkyltriamines and long-chain fatty acids, and also their ethoxylates and/or quaternized variants. These compounds possess the following structure:

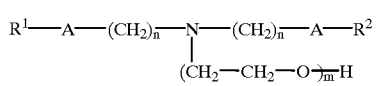

in which $R^1$ and $R^2$ independently of one another are $C_8$–$C_{24}$ n- or iso-alkyl, preferably $C_{10}$–$C_{18}$ n-alkyl,
A is —CO—NH— or —NH—CO—,
n is 1–3, preferably 2, and
m is 1–5, preferably 2–4.

Through quaternization of the tertiary amino group it is additionally possible to introduce a radical $R^3$, which can be $C_1$–$C_4$-alkyl, preferably methyl, and a counterion X, which can be chloride, bromide, iodide or methyl sulfate. Amidoamino ethoxylates and their quaternized derivatives are offered under the trade names ®Varisoft 510, ®Varisoft 512, ®Rewopal V 3340 and ®Rewoquat W 222 LM.

The preferred concentrations in which the oligoesters of the invention are employed in the fabric softener formulations correspond to those specified for detergent formulations.

In addition to the abovementioned uses in detergents and fabric softeners/laundry aftertreatment compositions, the oligoesters of the invention can be employed in all household cleaning compositions and all industrial cleaning compositions in order to obtain a good soil release effect with respect to hydrophobic soiling. The household and industrial cleaning compositions can include the abovementioned representative examples of surfactants, builders, fluorescent whiteners, bleaches and enzymes.

Examples of household cleaning compositions are all-purpose cleaners, dishwashing detergents, carpet cleaning and impregnating compositions, cleaners and polishes for floors and other hard surfaces, e.g. those made of plastic, ceramic or glass.

Examples of industrial cleaning compositions are cleaners and polishes for plastics, such as for casings and car fittings, and also cleaners and polishes for painted surfaces such as car bodywork.

Cleaning compositions formulated as liquids and containing the oligoesters of the invention generally have a neutral to acidic pH.

EXAMPLES

Example 1

194.2 g of dimethyl terephthalate, 39.8 g of ethylene glycol, 96.6 g of 1,2-propylene glycol, 9.2 g of glycerol, 0.37 g of anhydrous sodium acetate and 0.19 g of titanium tetraisopropylate are charged to a 1 l four-neck flask with KPG stirrer, 20 cm Vigreux column with Claisen bridge, internal thermometer and gas inlet pipe. The mixture is then rendered inert with nitrogen and heated over the course of half an hour to 165–167° C. In the course of a further 2.5 hours the temperature is raised to 215–220° C. The transesterification and thus the distillation of methanol begins at an internal temperature of about 165° C. After about 5 hours, more than 98% of the expected amount of methanol has distilled off. The mixture is cooled to about 80° C. and then 72.0 g of methylpolyethylene glycol 750, 91.2 g of methylpolyethylene glycol 1820 and 387.5 g of polyethylene glycol 1500 are added. The flask is again rendered inert and heated to 200–220° C., and then the pressure is reduced to 1–5 mbar over the course of about 1 hour and condensation is carried out at 220–240° C. for a further 2–5 hours, in the course of which a mixture of ethylene glycol and 1,2-propylene glycol is distilled off. After the end of the condensation, the mixture is aerated with nitrogen and cooled. On cooling to room temperature, the product solidifies to a solid mass. Yield 730 g.

In analogy to Example 1, the oligoesters of the invention can also be prepared with the following starting materials:

Example 2

213.5 g of dimethyl terephthalate
43.7 g of ethylene glycol
106.2 g of 1,2-propylene glycol
4.5 g of pentaerythritol
0.41 g of sodium acetate, anhydrous
0.21 g of titanium tetraisopropylate
39.6 g of methylpolyethylene glycol 750
50.2 g of methylpolyethylene glycol 1820
426.3 g of polyethylene glycol 1500
Yield 720 g

Example 3

145.6 g of dimethyl terephthalate
109.0 g of 1,2-propylene glycol
1.4 g of mannitol
0.28 g of sodium acetate, anhydrous
0.14 g of titanium tetraisopropylate
82.2 g of methylpolyethylene glycol 750
581.3 g of polyethylene glycol 3000
Yield 800 g

Example 4

194.2 g of dimethyl terephthalate
39.8 g of ethylene glycol
96.6 g of 1,2-propylene glycol
... 6.0 g of trimethylolethane
0.37 g of sodium acetate, anhydrous
0.19 g of titanium tetraisopropylate
54.0 g of methylpolyethylene glycol 750
68.4 g of methylpolyethylene glycol 1820
68.9 g of polyethylene glycol 1500
129.2 g of polyethylene glycol 800
258.3 g of polyethylene glycol 3000
Yield 760 g

Example 5

223.3 g of dimethyl terephthalate
45.7 g of ethylene glycol
111.1 g of 1,2-propylene glycol
1.6 g pentaerythritol
0.42 g of sodium acetate, anhydrous
0.22 g of titanium tetraisopropylate
28.2 g of methylpolyethylene glycol 750
35.7 g of methylpolyethylene glycol 1820
445.6 g of polyethylene glycol 1500
Yield 720 g

Example 6

174.7 g of dimethyl terephthalate
19.0 g of ethylene glycol
107.5 g of 1,2-propylene glycol
3.3 g of trimethyolethanol
0.33 g of sodium acetate, anhydrous
0.17 g of titanium tetraisopropylate
83.8 g of methylpolyethylene glycol 750
174.4 g of polyethylene glycol 1500
348.8 g of polyethylene glycol 3000
Yield 765 g

Example 7

48.5 g of dimethyl terephthalate
10.0 g of ethylene glycol
24.2 g of 1,2-propylene glycol
3.5 g of glycerol
0.10 g of sodium acetate, anhydrous
0.05 g of titanium tetraisopropylate
730 g of methylpolyethylene glycol 20,000
97.0 g of polyethylene glycol 1500
Yield 880 g

Example 8

233.0 g of dimethyl terephthalate
47.7 g of ethylene glycol
115.9 g of 1,2-propylene glycol
8.1 g of 1,2,3-hexanetriol
0.44 g of sodium acetate, anhydrous
0.23 g of titanium tetraisopropylate
22.8 g of n-butylpolyethylene glycol 200
465.0 g of polyethylene glycol 1500
Yield 700 g

Example 9

194.2 g of dimethyl terephthalate
39.8 g of ethylene glycol
96.6 g of 1,2-propylene glycol
1.0 g of glycerol
0.37 g of sodium acetate, anhydrous
0.19 g of titanium isopropylate
226.5 g of tallow fatty alcohol+80 mol of ethylene oxide
387.5 g of polyethylene glycol 1500
Yield 800 g

Example 10

194.2 g of dimethyl terephthalate
39.8 g of ethylene glycol
96.6 g of 1,2-propylene glycol
4.6 g of glycerol
0.37 g of sodium acetate, anhydrous
0.19 g of titanium tetraisopropylate
180.3 g of nonylphenol+23 mol of ethylene oxide
387.5 g of polyethylene glycol 1500
Yield 805 g The soil release oligoesters of the invention were compared in respect of their soil release effect with soil release polymers of the prior art.

For this purpose the substances were added in concentrations of 1% and 2% (active ingredient), based on the detergent formulation (see Table 2), to the wash liquor which had been used to prewash the polyester test fabric WFK 30 A (WFK=Wäschereiforschungsanstalt [Laundry Research Institute] Krefeld). The fabrics pretreated in this way were dried and soiled with used engine oil. After leaving the oil to act for a period of 1 hour, the test swatches were washed without the addition of the soil release oligoesters of the invention or of soil release polymers of the prior art. The reflectance of the test fabrics was then measured. The prior art soil release polymers used were the following compounds:

Comparative Example 1

Compounds according to EP-B-0 185 427, page 23, Table IV, line 4, used in each case in the amount indicated in the table

Comparative Example 2

Compounds according to EP-B-0 185 427, page 23, Table IV, line 5, used in each case in the amount indicated in the table

Comparative Example 3

Repel-O-Tex SRP 4, Rhône-Poulenc, used in each case in the amount indicated in the table.

Comparative Example 4

Sokalan 9976, BASF, used in each case in the amount indicated in the table.

TABLE 1

| Washing conditions | |
|---|---|
| Washing machine: | Linitest |
| Water hardness: | 20° dH |
| Liquor ratio: | 40:1 |
| Washing temperature: | 40° C. |
| Washing time: | 30 min. |
| Detergent conc.: | 6 g/l |

TABLE 2

| Composition of the liquid detergent | |
|---|---|
| Liquid detergent I | Composition (% by weight) |
| Genapol ® OA 080 | 12.0 |
| Hostapur ® SAS 60 | 17.0 |
| Fatty acid mixture coconut/olein | 14.0 |
| KOH 85% strength | 2.6 |
| Triethanolamine | 2.0 |
| Tri-Na citrate dihydrate | 5.0 |
| Dequest 2066 | 4.0 |
| 1,2-Propylene glycol | 5.0 |
| Ethanol | 3.0 |
| Water | ad 100 |

TABLE 3

Washing results with the oligoesters of the invention together with liquid detergent I

| Detergent formulation I | Reflectance (%) |
|---|---|
| I without additive | 21.5 |
| I + 1% oligoester of: | |
| Ex. 1 | 41.7 |
| Ex. 2 | 39.2 |
| Ex. 3 | 38.9 |
| Ex. 4 | 39.8 |
| Ex. 5 | 40 |
| Ex. 6 | 38.9 |
| Ex. 7 | 31.8 |
| Ex. 8 | 39.1 |
| Ex. 9 | 35.1 |
| Ex. 10 | 39.6 |

TABLE 4

Washing results with the oligoesters of the invention in comparison with prior art soil release polyesters. Application in liquid detergent I

| Detergent formulation I | Reflectance (%) |
|---|---|
| I without additive | 21.9 |
| I + 1% oligoester: | |
| Comparative example 1 | 24.8 |
| Comparative example 2 | 22.6 |
| Comparative example 3 | 32.0 |
| Comparative example 4 | 26.3 |
| Ex. 1 | 40.9 |
| Ex. 5 | 40 |
| Ex. 6 | 38.9 |

TABLE 5

Washing results as a function of the application concentration. Comparison with a prior art soil release polyester.

| Detergent formulation I | Reflectance (%) |
| --- | --- |
| I without additive | 21.5 |
| I + 1% Comparative example 3 | 31.5 |
| I + 1% oligoester Ex. 1 | 41.5 |
| I + 2% Comparative example 3 | 36.0 |
| I + 2% oligoester Ex. 1 | 44.6 |

The soil release oligoesters of the invention were likewise tested in respect of a wash-enhancing action on soiled test fabrics from the WFK.

For this purpose they were applied together with the liquid detergent in accordance with Table 2. Soil release polymers of the prior art served as comparison. Subsequently, soiled test fabrics WFK 30 C and WFK 30 D were washed and the reflectances were measured. Four wash cycles were conducted in each case. The washing conditions correspond to those in Table 1. The following results were obtained:

TABLE 6

Wash-enhancing action of the above-described oligoesters on WFK 30 C

| | Reflectance (%) as a function of the washing cycles | | | |
| --- | --- | --- | --- | --- |
| Detergent formulation I | 1x | 2x | 3x | 4x |
| I without additive | 35.0 | 36.4 | 37.7 | 38.5 |
| I + 1% Comparative example 3 | 35.6 | 38.5 | 40.7 | 42.6 |
| I + 1% Ex. 1 | 35.9 | 43.8 | 55.0 | 62.8 |

TABLE 7

Wash-enhancing action of the above-described oligoesters on WFK 30 D

| | Reflectance (%) as a function of the washing cycles | | | |
| --- | --- | --- | --- | --- |
| Detergent formulation I | 1x | 2x | 3x | 4x |
| I without additive | 41.8 | 44.7 | 46.6 | 47.9 |
| I + 1% Comparative example 3 | 44.0 | 51.1 | 56.3 | 60.2 |
| I + 1% Ex. 1 | 47.0 | 59.7 | 64.7 | 66.9 |

List Of Trade Names Used

®Genapol OA 080/Clariant GmbH Pure $C_{14}/C_{15}$ fatty alcohol ethoxylate with 8 EO ®Hostapur SAS 60/Clariant GmbH Secondary $C_{13}-C_{17}$ n-alkanesulfonate sodium salt, 60% strength ®Repel-O-Tex/Rhône-Poulenc Ethylene glycol-polyethylene glycol-terephthalic acid copolymer to 70%, remainder sodium sulfate and sodium aluminum silicate ®Sokalan 9976/BASF 50% nonionic polycondensate on 50% $Na_2SO_4$ ®Dequest 2066/Monsanto 25% strength aqueous solution of the heptasodium salt of diethylenetriamine-penta (methylene phosphonic acid)

What is claimed is:

1. An oligoester obtained by polycondensation of
a) from 40 to 52 mol %, of one or more dicarboxylic acids or esters thereof,
b) from 10 to 40 mol %, of ethylene glycol and/or propylene glycol,
c) from 3 to 20 mol %, of polyethylene glycol,
d) from 0.5 to 10 mol %, of a water-soluble addition product of from 5 to 80 mol of an alkylene oxide with 1 mol of $C_1-C_{24}$-alcohols, $C_6-C_{18}$-alkylphenols or $C_8-C_{24}$-alkylamines and
e) from 0.4 to 10 mol %, of one or more polyols having from 3 to 6 hydroxyl groups.

2. A process for the preparation of the oligoesters of claim 1, which comprises heating components a, b, c, d and e, with the addition of a catalyst, to temperatures of from 160 to 220° C. firstly at atmospheric pressure, and then continuing the reaction under reduced pressure at temperatures of from 160 to 240° C.

* * * * *